(12) United States Patent
Saxena (10) Patent No.: US 7,892,521 B2
(45) Date of Patent: Feb. 22, 2011

(54) SYNTHESIS AND USE OF METAL HYDRIDES FOR VEHICULAR AND OTHER APPLICATIONS

(76) Inventor: Surendra Saxena, 11455 SW. 92 Ct., Miami, FL (US) 33176

( * ) Notice: Subject to any disclaimer, the term of this patent is extended or adjusted under 35 U.S.C. 154(b) by 118 days.

(21) Appl. No.: 11/773,286

(22) Filed: Jul. 3, 2007

(65) Prior Publication Data
US 2010/0098622 A1 Apr. 22, 2010

Related U.S. Application Data

(60) Provisional application No. 60/818,454, filed on Jul. 3, 2006.

(51) Int. Cl.
| | |
|---|---|
| C01B 6/00 | (2006.01) |
| C01B 6/04 | (2006.01) |
| C01B 6/24 | (2006.01) |
| C01B 3/00 | (2006.01) |
| C01B 3/02 | (2006.01) |
| C01B 3/06 | (2006.01) |
| C01B 3/08 | (2006.01) |
| C01B 3/10 | (2006.01) |

(52) U.S. Cl. ............ 423/657; 252/188.25; 252/188.26; 423/645; 423/646; 423/647; 423/648.1; 423/658.2

(58) Field of Classification Search ....................... None
See application file for complete search history.

(56) References Cited

U.S. PATENT DOCUMENTS 3,728,434 A * 4/1973 Sanders .................. 423/274
5,308,553 A * 5/1994 Cisneros ................ 252/601
5,514,353 A * 5/1996 Adlhart .................. 422/239

FOREIGN PATENT DOCUMENTS

JP 60141613 A * 7/1985

OTHER PUBLICATIONS

JP 60-141613 A, Ito et al., English Abstract, Jul. 26, 1985, "Preparation of Silicon Hydride".*

* cited by examiner

*Primary Examiner*—Melvin C Mayes
*Assistant Examiner*—Colin W Slifka
(74) *Attorney, Agent, or Firm*—Todd L. Juneau; Jason S. Tiedeman (57) ABSTRACT

The invention provides for the synthesis of a hydride directly from metal and water or metal and hydroxide or metal and aqueous hydrogen chloride. The hydride generated may be used as metal hydride slurry for on-board generation of hydrogen by reaction with water or with aqueous HCl.

10 Claims, 5 Drawing Sheets

SYNTHESIS AND USE OF METAL HYDRIDES FOR VEHICULAR AND OTHER APPLICATIONS

CLAIM TO PRIORITY

This application claims benefit under 35 USC 119(e) of the filing date of U.S. provisional application 60/818,454 filed 3 Jul. 2006.

BACKGROUND

Hydrogen is undoubtedly the viable energy source for future. Many storage materials have been proposed but only few if any come close to the US Department of Energy Requirements of the gravimetric and volumetric densities for storage and transportation. One of the high-priority goals of the Department of Energy is "Finding effective hydrogen storage materials" which they list as one of the most difficult challenges facing hydrogen-powered transportation.

It is considered that a hydride may be found which is light in density and high in hydrogen content and which may give up hydrogen at low temperatures and the metal so produced can be rehydrogenated and the cycle be continued for reasonable period of time. While we search such a dream material, it is clear that hydrides will remain critical industrial materials because of their many other applications (e.g. in nuclear applications). The finding described here makes it possible to produce the hydrides at a low cost and in an environmentally friendly way. Several hydrides of the alkali metals with B and Al may be synthesized this way. All these hydrides are currently the topic of intensive research and while all of them are more stable than needed for reversibility for automobile use, it is likely that there may be methods found to destabilize them. Therefore the use of the current method should be of great significance.

Whatever the future uses of this technique, there is one immediate possibility. The generation of hydrogen by the reaction of magnesium hydride with water for automobile use. The hydride can be used in a slurry (McClaine et al, [1]) or in hydride cartridges (U.S. Pat. No. 5,514,353). The method being patented here saves the cost of separately producing hydrogen and then synthesizing the hydride by metal-hydrogen reaction. The novelty of the method is that it eliminates the need of separately producing hydrogen from costly methods such as the splitting of methane at high-temperature and other fossil fuels. It also eliminates the need of $CO_2$ sequestration which is a by-product of fossil fuel gasification. The chemical hydride slurry method, involving one of the metal hydride slurries may become viable in near future. The invention described here would influence the cost of the hydrogen fuel production in a very significant way as well as the cost of recycling Mg metal or magnesium hydride. It may make a difference whether the slurry method is economically viable or not. This document also refers to the synthesis of other hydrides directly from metal-water-hydroxide-HCl reactions. In each case however a metal oxide or a chloride forms which would require the cost of reduction to metal. We propose a reduction of the oxide and chloride by using sodium or sodium hydride which brings down the cost of recycling the reactants.

Below is listed some related U.S. patent documents. These are the patents that deal with generation of hydrogen using metal hydride water reaction. None of the methods duplicate the method described in the document above.

U.S. Pat. No. 5,958,098: Method and composition in which metal hydride particles are embedded in a silica network.

U.S. Pat. No. 5,308,553: Metal hydride compositions and methods.

U.S. Pat. Nos. 5,514,353 and 5,833,934: Demand responsive hydrogen generator based on hydride water reaction.

USPatent# 20040258613: Process for the production and purification of sodium hydride.

USPatent# 20050053547: Method for activating metal hydride material.

USPatent# 20020100682: Hydrogen recharging system for fuel cell hydride storage reservoir.

USPatent# 20030014917: Chemical hydride hydrogen generation system and an energy system incorporating the same.

USPatent# 20040166057: Powder metal hydride hydrogen generator.

USPatent# 20050058595: Reactor and method for generating hydrogen from a metal hydride.

U.S. Pat. No. 6,143,270: anhydrous magnesium chloride

U.S. Pat. No. 5,665,220: Electrolytic magnesium production

U.S. Pat. No. 6,372,017: Method for producing magnesium

U.S. Pat. No. 5,782,952: Method for producing magnesium

U.S. Pat. No. 4,720,375: Process for producing magnesium oxide

U.S. Pat. No. 5,162,108: Method for preparing active magnesium hydride

SUMMARY

Part 1. The invention provides for the synthesis of a hydride directly from metal and water or metal and hydroxide or metal and hydrogen chloride. Such a method combines the process of generating hydrogen (usually from a fossil source) and then combining with a metal to form a hydride in a single process. The use of water or hydroxide or HCl involves a powder metal source, a water/hydroxide/HCl source, a mixing device and a sealed inert gas flushed reaction chamber heated between 100 and 400° C. Examples of reactions are given using magnesium metal. The following type reactions may be used to synthesize a hydride directly using water, hydroxide, hydrogen chloride or ammonium chloride:

(1)

2Mg+H2O=MgH2+MgO (2)

2Mg+2HCl=MgH2+MgCl2

(3)

4Mg+NH4Cl=2MgH2+0.5Mg3N2+0.5MgCl2

Recycling of Mg may be achieved from (4)

MgO+2HCl=MgCl2+H2O (5)

Mg3N2+6HClh=2NH3+3MgCl2

(6)

MgCl2+2Na=Mg+2NaCl

Sodium is so much cheaper than Mg that discarding NaCl will not affect the cost significantly.

The schematics of an apparatus is developed, which could deliver the products metal oxide (reaction 1) or chloride (reaction 2) and metal hydride. Other hydrides included in this invention are:

(7)

Li+B+H2O=0.5LiBH4+0.5LiBO2

(8)

Na+B+H2O=0.5NaBO2+0.5NaBH4

Part 2. The hydride generated from Part 1 or generated by other processes may be used as metal hydride slurry for on-board generation of hydrogen by reaction with water (or aqueous HCl, the addition of the latter will promote the reaction):

$$MgH_2 + H_2O = MgO + 2H_2 \quad (9)$$

MgO may be reduced to the metal by reactions (4 and 5) or MgCl2 from reaction (6) may be combined with NaH (from any source) to yield MgH2 as follows:

$$MgCl_2 + 2NaH = MgH_2 + 2NaCl. \quad (10)$$

In each of the reactions (1, 2, 5, 6, 7 and 9) the solid mixtures must be separated to individual phases using density separator. Water mentioned in the above reactions may be replaced by a hydrous solid such as brucite ($Mg(OH)_2$) for convenience.

The on-board hydrogen availability is between 8 and 9% and the cost of putting a 4 kg $H_2$ in the gas tank may be comparable to that of gasoline.

In a preferred embodiment, the invention provides a process and a reactor apparatus for the process of generating hydrogen for use in an engine, comprising the steps of:

a. means for producing a hydride slurry by reacting a powder metal with a compound selected from the group consisting of water, hydroxide, and HCl, wherein the reaction is a low temperature process performed in a sealed inert gas flushed reaction chamber heated between 100 and 400° C.;

b. means for reacting the hydride slurry with a compound selected from water or from a hydrous solid, to provide hydrogen; and c. means recycling the metal by reduction with sodium or sodium hydroxide.

In another preferred embodiment, the invention provides wherein the powder metal is magnesium and the compound is water as described by the equation 2Mg+H2O=MgH2+MgO.

In another preferred embodiment, the invention provides wherein the powder metal is magnesium and the compound is 2HCL as described by the equation 2Mg+2HCl=MgH2+MgCl2.

In another preferred embodiment, the invention provides wherein the powder metal is magnesium and the compound is NH4Cl as described by the equation 4Mg+NH4Cl=2MgH2+0.5Mg3N2+0.5MgCl2.

In another preferred embodiment, the invention provides wherein the recycling of Mg is achieved by a reaction selected from the group consisting of:

$$MgO + 2HCl = MgCl2 + H2O; \quad (a)$$

$$Mg3N2 + 6HCl = 2NH3 + 3MgCl2; \text{ and,} \quad (b)$$

$$MgCl2 + 2Na = Mg + 2NaCl. \quad (c)$$

In another preferred embodiment, the invention provides wherein the hydride formation reaction is described by the equation Li+B+$H_2O$=0.5 LiBH$_4$+0.5 LiBO$_2$; and wherein the hydride formation reaction is described by the equation Na+B+$H_2O$=0.5NaBO$_2$+0.5 NaBH$_4$.

In another preferred embodiment, the invention provides wherein the solid mixtures are separated to individual phases using density separator.

In another preferred embodiment, the invention provides wherein water is the reactant for the hydride slurry.

In another preferred embodiment, the invention provides wherein aqueous HCl is the reactant for the hydride slurry.

In another preferred embodiment, the invention provides wherein the method provides on-board hydrogen availability between 8 and 9%.

BRIEF DESCRIPTION OF THE DRAWINGS

FIG. 1 shows that diffraction at 150 C yields a small peak due to MgH2 at around 2Θ value of 12.8 and shoulder on the Mg peak at 16.5.

FIG. 2 shows a comparison of X-ray results.

FIG. 2 shows the process of hydride synthesis.

FIG. 4 shows the conservation of materials for the various processes.

FIG. 5 shows an example of an fuel cell engine and the related components.

DETAILED DESCRIPTION

A number of hydrides are currently being studied for use as possible hydrogen storage material for various applications. The object of the invention is to produce a metal hydride directly from a reaction between water or hydroxide or HCl and metal and to provide the products in such a way that they are mostly recyclable and may be used either as hydrides in many applications, or hydrides for on-board use with reversibility or for producing hydrogen on-board by chemical reactions e.g. the chemical slurry method.

This work demonstrates that under certain conditions, it is possible to synthesize a metal hydride by making the metal react with water/hydroxide/HCl. Such a synthesis route dispenses with the need for separately forming hydrogen by an expensive process and then to synthesize a hydride by metal-hydrogen reaction. The costs involved are as follows:

Currently the Formation of Hydride Requires:

Production of hydrogen from fossil fuel (a high-temperature process)

Production of hydride from a metal-hydrogen reaction or by some chemical route

Metals must be produced from ores and natural raw material

With this Process:

Produce hydride with metal and water or hydroxide or HCl (low temperature process)

Recycle the metal by reduction with sodium or sodium hydroxide

An actual cost comparison can be made for some cases. If the cost of reducing the metal goes down, as described here, the advantage of the proposed method will go up. If "reversible" hydride can be found, synthesizing it directly from water would be a perfect solution to our energy problem.

How to make a Hydride

From Water.

The reactants needed are: water, finely divided powder of the metals, in this case Mg. These must be mixed in exact proportions according to reaction (1) 2Mg+$H_2O$=MgH$_2$+MgO, which is 4.86 kg of solid Mg with 1.8 kg of water to produce 2.63 kg of solid MgH2 and 4.3 kg of MgO.

From Hydroxide:

With hydroxide brucite Mg(OH)$_2$, we use the reaction 2 Mg+Mg(OH)2=MgH2+2 MgO mixing 4.86 kg of Mg metal powder with 5.83 kg of brucite (Mg(OH)2) to produce 8.06 kg of MgO and 2.63 kg of MgH2.

From HCl or NH4Cl:

With hydrogen chloride or ammonium chloride, we use the reaction e.g. (2) 2Mg+2HCl=MgH2+MgCl2, thus mixing 4.86 kg of Mg powder with 7.29 kg of HCl producing 2.63 kg of MgH2 and 9.52 kg of MgCl2.

The reaction is performed in a reaction chamber (FIG. 3) with appropriate access for all the reactants and the retrieval of the products.

Figure 3:
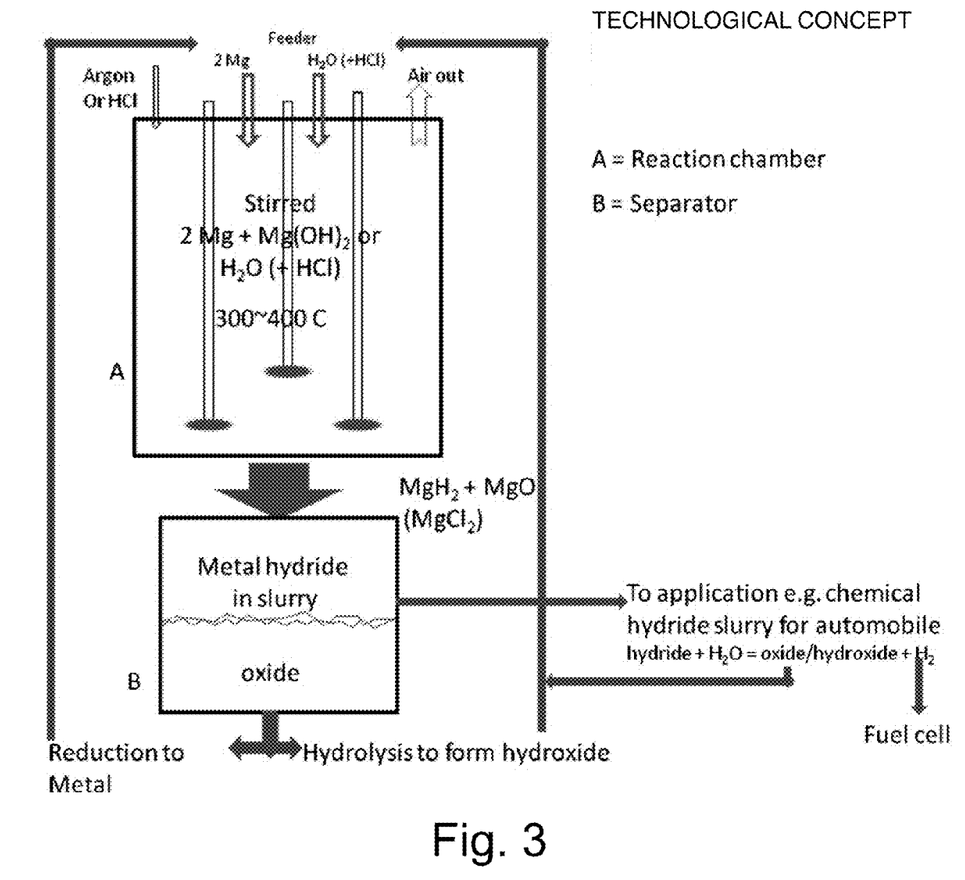
FIG. 3. is a schematic presentation.

Description of the Reactor (see FIG. 3):

The reactions described above can be accomplished in a reactor which will comprise of a sealed steel drum with inert gas or HCl inlet, a water inlet if water is used, a mixer/stirrer, and a feeder for the solids and outlets for the products and gases. The chamber is capable of heating the reactants up to 400 C as required and is lined with a ceramic material on the inside to avoid any reaction with steel.

Reaction:

Measured amounts of reactants as described above are introduced in the reactor and the material is heated over a pre-determined length of time at a pre-determined temperature. The material is constantly stirred as it is heated for a complete reaction.

Physical Separation of the Reaction Products:

Mixtures of MgH2 (density=1.45 gm/cm3) and MgO (density=3.6 gm/cm3) or MgCl2 (2.3 gm/cm3) are produced in the reaction chamber and are separated either in a centrifuge or by froth floatation using a suitable organic liquid. This is achieved in a second steel drum (FIG. 3) in which the oil-based or an organic-liquid (as used for separation) slurry is created with the products from the reactor referred above. The bottom heavy slurry would contain the oxide and the top light slurry would contain hydride which is removed and used for vehicular application as described in the next section of this document. The heavy slurry with oxide is removed from the bottom and taken for conversion to hydroxide (in case of MgO) and continuous use in the reactor as described above or for reduction as described below. Because of the corrosive nature of the materials, the steel drums will be lined with a suitable non reactive ceramic material.

Recycling the Material:

We use the following reaction $$MgO+2HCl(aq)=MgCl_2+H_2O \qquad (3)$$

to convert MgO to chloride or by reaction Mg3N2 to chloride and then to oxide. The reaction may proceed via formation of a hydrated MgCl2.6H2O which is then dehydrated. The chloride can be used to get Mg by the usual electrolytic reduction of the chloride or we may use the following reaction:

$$MgCl_2+2Na=Mg+2NaCl \qquad (6)$$

Sodium is so much cheaper than Mg that discarding NaCl will not affect the cost significantly. The oxide is converted to chloride and which in turn is reduced by reaction with Na. We may also use NaH to directly convert Mg to MgH2 by the reaction $$MgCl_2+2NaH=MgH_2+2NaCl. \qquad (10)$$

Reduction of the oxide to metal can be achieved in a third reactor which would be similar to the first reactor (FIG. 3) requiring low temperature heating. The mixture of Mg and NaCl and of MgH2 and NaCl will be separated in a fourth steel drum similar to the one shown in FIG. 3.

There will be the need to recover as much of the organic liquid used for gravitational separation of the solids as possible. We can recognize several organic non-reactive liquids which have a density between 1.5 and 2.0 g/cm3 which can be used for separation.

How to Use the Hydride in Generating Hydrogen for Fuel Cell in an Automobile

Magnesium hydride (MgH2) can be made to react with water or with water and dilute HCl solution to produce hydrogen in an automobile tank. There are at least two possible patented methods to generate hydrogen from the hydride-water reaction. One method is based on a hydride cartridge with a corrugated structure (U.S. Pat. Nos. 5,514,353 and 5,833,934: Demand responsive hydrogen generator based on hydride water reaction) and the other using an oil-based slurry (Mclaine et al. 1). Either method can be used for the hydrogen generation.

It is proposed here that adding HCl in various dilutions can enhance the rate of reaction of hydride and water. It is further claimed that the hydride generated from the methods described in this work or generated by other processes may be used as metal hydride slurry or put in hydride cartridges (see above) for on-board generation of hydrogen by reaction with water (or aqueous HCl, the addition of the latter will promote the reaction):

$$MgH_2+H_2O=MgO+2H_2 \qquad (9)$$

MgO may be reduced to the metal by reactions (4 and 5) or MgCl2 from reaction (4) may be combined with NaH (from any source) to yield MgH2 as follows:

$$MgCl_2+2NaH=MgH_2+2NaCl. \qquad (10)$$

Using water with HCl has two critical advantages; first the reaction rate is enhanced and second no ball-milling of the hydride is necessary.

A binary metal hydride is usually prepared from a reaction between metal and hydrogen. Presence of oxygen in any form is considered detrimental to the synthesis and all water is avoided. This study shows that the well-known reaction of metal with water to extract hydrogen can be used to form hydride when excess metal is used in the same reaction. The reaction can be also carried on with a hydroxide or HCl.

Part 1. The synthesis of a hydride directly from metal and water or metal and hydroxide or metal and hydrogen chloride is proposed. Such a method combines the process of generating hydrogen (usually from a fossil source) and then combining with a metal to form a hydride in a single process. The use of water or hydroxide or HCl involves a powder metal source, a water/hydroxide/HCl source, a mixing device and a sealed inert gas flushed reaction chamber heated between 100 and 400° C. Examples of reactions are given using magnesium metal. The following type reactions may be used to synthesize a hydride directly using water or hydroxide or hydrogen chloride or ammonium chloride:

$$2Mg+H_2O=MgH_2+MgO \qquad (1)$$

$$2Mg+2HCl=MgH_2+MgCl_2 \qquad (2)$$

$$4Mg+NH_4Cl=2MgH_2+0.5Mg_3N_2+0.5MgCl_2 \qquad (3)$$

Recycling of Mg may be achieved from $$MgO+2HCl=MgCl_2+H_2O \qquad (4)$$

$$Mg_3N_2+6HCl=2NH_3+3MgCl_2 \qquad (5)$$

$$MgCl_2+2Na=Mg+2NaCl \qquad (6)$$

Sodium is so much cheaper than Mg that discarding NaCl will not affect the cost significantly.

The schematics of an apparatus is developed, which could deliver the products metal oxide (reaction 1) or chloride (reaction 2) and metal hydride. Other hydrides included in this invention are:

$$Li+B+H_2O=0.5LiBH_4+0.5LiBO_2 \quad (7)$$

$$Na+B+H_2O=0.5NaBO_2+0.5NaBH_4 \quad (8)$$

Both Li- and Na-borate produced above may be reacted with MgH2 to generate the LiBH4 and NaBH4 and the MgO so produced can be reduced to Mg as described elsewhere in this document.

Part 2. The hydride generated from Part1 or generated by other processes may be used as metal hydride slurry for on-board generation of hydrogen by reaction with water (or aqueous HCl, the addition of the latter will promote the reaction):

$$MgH_2+H_2O=MgO+2H_2 \quad (9)$$

MgO may be reduced to the metal by reactions (4 and 5) or MgCl2 from reaction (6) may be combined with NaH (from any source) to yield MgH2 as follows:

$$MgCl_2+2NaH=MgH_2+2NaCl. \quad (10)$$

In each of the reactions (1, 2, 5, 6, 7 and 9) the solid mixtures must be separated to individual phases using density separator. Water mentioned in the above reactions may be replaced by a hydrous solid such as brucite ($Mg(OH)_2$) for convenience.

The on-board hydrogen availability is between 8 and 9% and the cost of putting a 4 kg $H_2$ in the gas tank may be comparable to that of gasoline.

To illustrate this process, the following reactions are considered: $2M+H_2O=MH_2+MO$, and $2M+M(OH)_2=MH_2+2MO$, where M could be a divalent cation such as Mg. Several other reactions using different metals are listed in Table 1. Thermodynamically both the sets of reactions proceed forward at room temperature (kinetics permitting). The availability of thermodynamic data restricts the list to the following but others could be added as more data becomes available: binary NaH, LiH, $MgH_2$ and ternary $LiAlH_4$, $NaAlH_4$, $LiBH_4$ and $NaBH_4$. Thermodynamic calculations showing the formation of these compounds are summarized in Table 1.

TABLE 1

Formation reactions of hydrides at 300 K

| # | Reactants | Products | ΔH, kJ |
|---|---|---|---|
| 1. | Li + B + $H_2O$ | $0.5LiBH_4 + 0.5LiBO_2$ | −319 |
| 2. | Li + B + $Mg(OH)_2$ | $MgO + 0.5LiBH_4 + 0.5LiBO_2$ | −282 |
| 3. | Na + B + $H_2O$ | $0.5NaBO_2 + 0.5NaBH_4$ | −297 |
| 4. | 4Li + $H_2O$ | $2LiH + Li_2O$ | −494 |
| 5. | 2Mg + $Mg(OH)_2$ | $2MgO + MgH_2$ | −397 |
| 5. | 2Mg + $H_2O$ | $MgO + MgH_2$ | −392 |
| 6. | Na + Al + $H_2O$ | $0.57NaH + 0.36NaAlH_4 + .071NaAl_9O_{14}$ | −344 |
| 7 | Li + Al + $H_2O$ at 225 bar | $0.667LiH + 0.333LiAlH_4 + 0.333Al_2O_3$ | −365 |
| 8 | Be + $H_2O$ at 375 bar | $0.5BeO + 0.5BeH_2$ | −167 |
| 9 | 2Mg + 2HCl | $MgH2 + MgCl2$ | |
| 10 | 4Mg + $NH_4Cl$ | $2MgH2 + 0.5Mg3N2 + 0.5MgCl2$ | |

The mixture of water or other reactants and the solids must be carefully weighed for the hydride formation; otherwise the reaction to produce hydrogen sets in. It is possible to use hydroxide or HCl instead of water (Table 1) or NaOH in stead of Na. In each case, the product is a mixture of hydride and oxide or chloride, which must be separated from each other. This can be achieved with density separation methods because the hydrides are significantly lighter than the oxides or chorides. Data on Li—$H_2O$ (reaction 4, Table 1) have been reported by Klanchar et al. [4], Cook and Plante [5], Besson and Muller [6] and Chan and Tan [7]. Klanchar et al. [4] used a thermoelectric calorimeter to study the lithium-water reaction and reported the final product as consisting of a mixture of $Li_2O$ and LiH with small amounts of LiOH and $H_2$.

Figure 1:
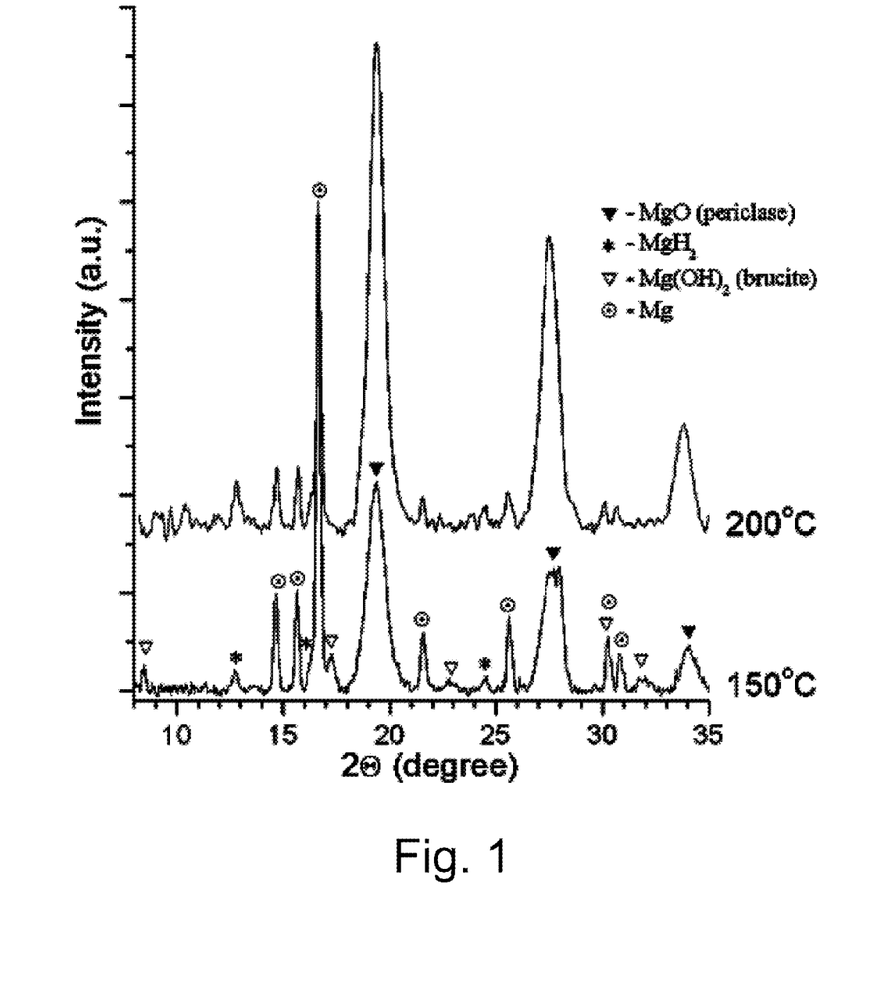
FIG. 1. is a graph of X-ray results.
Figure 2:
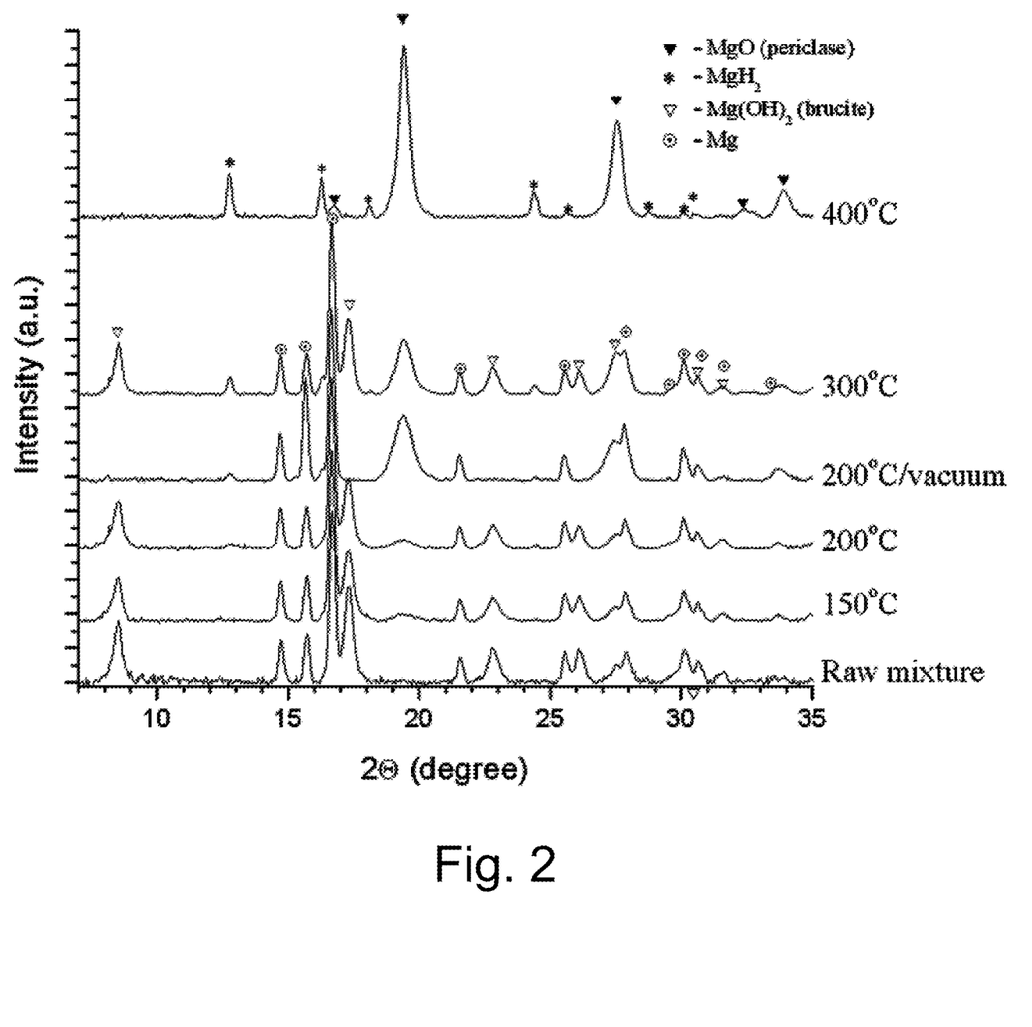
FIG. 2. is a graph of X-ray results.

Several experiments were conducted to test the thermodynamic predictions in the Mg—$H_2O$ system. This system is important for hydrogen storage for automobile use because MgH2 may be used in oil-based slurry for filling the tanks [1]. In four different experiments, the formation of MgH2 from water proceeded via the reactions: $Mg+2H_2O=Mg(OH)_2+H_2$ and $2Mg+Mg(OH)_2=MgH_2+2MgO$. Therefore, only the data on the hydroxide reaction with metal is presented. The experiments were carried out in several different types of sealed containers. A mixture of micron sized magnesium metal and magnesium hydroxide was pressed into pellets. The pellets were placed in a quartz tube which was evacuated and sealed. The pellets were also put directly in a vacuum chamber. The samples were heated in the temperature range of 150 to 400° C. FIG. 1 shows the results obtained in vacuum heating. There are two small but distinct reflections for MgH2 and good development of the MgO reflections which show the validity of the thermodynamic reaction between the hydroxide and metal. The temperature for the dissociation of brucite to water and MgO is 263° C. at 1 atm. It is likely that the dissociation temperature is lowered due to vacuum and water is released to combine with the metal. However, since any such water will be continuously removed, it is more likely that the metal reacted directly with the hydroxide. The patterns in the evacuated and the vacuum heated samples at 200 C are compared again at 200° C. to validate this argument (FIG. 2). While temperature may not be an important consideration in manufacturing a hydride, a low temperature production will of course be cost-effective.

FIG. 2. show the X-ray diffraction of a sample of 1:2 molar mixture of $Mg(OH)_2$ and Mg. At low temperatures there is a small recognizable shoulder peak of MgH2 at 2 θ of 16.3°. The final result of this heating at 400° C. is a complete reaction of brucite and metal to form MgH2 and MgO.

The oxides can be recycled to obtain the hydroxide. The metals will have to be recovered at some cost which needs to be taken into account for any application and must be compared with the cost of producing the hydride from a metal and hydrogen, when the latter is produced separately by an electrolytic reduction of water or from fossil fuel. In the present case, we may use sodium a cheaper metal or sodium hydride to reduce MgO and $MgCl_2$ as described in this document.

FIG. 1. X-ray results on a ball milled mixture of magnesium and brucite, $Mg(OH)_2$ (1:1 molar), which was pressed in a disc and heated in vacuum for 24 hours: The diffraction at 150 C shows a small peak due to MgH2 at around 2Θ value of 12.8 and shoulder on the Mg peak at 16.5; this development is more clearly established at 200 C.

FIG. 2. Comparison of X-ray results on a ball milled mixture of magnesium and brucite, $Mg(OH)_2$ (2:1 molar). The diffraction from the sample heated in vacuum at 200° C. clearly shows the formation of MgH2 (small peak at 2Θ of 12.8 and the shoulder peak on the Mg peak at 16.3°). The other results are for a similar mixture, which was pressed in a disc and heated in a sealed evacuated quartz tube for 24 hours: The diffraction at 150° C. shows a small peak of MgH2 at around 2Θ value of 16.3° as a shoulder on the Mg peak; this development continues with heating and finally results in a fully developed pattern at 300 and 400° C. In the last heating practically all brucite and Mg is consumed resulting in MgO and MgH2. The MgH2 peak intensities are half the intensity of the MgO peaks. A separately run mixture of 1:2 molar mix of $MgH_2$ and MgO confirmed that the $MgH_2$ produced is 2:1 molar ratio to MgO.

FIG. 3. Schematic presentation of the process of hydride synthesis. It shows a steel drum which allows a gas inlet for Argon or HCl and an air outlet to flush all air. The reactants metal and hydroxide or water/HCl MgO+2HCl=MgCl2+ H2O are fed from an opening at the top and continuously stirred. The reactor is insulated and heated above 300° C. Experiments have shown that a few bars of pressure built up keeps the hydride from dissociation or melting. The products are removed from the bottom and fed to a container B where the solids mix with the organic slurry. Since the oxide is denser than the hydride, the separation will be effective. The hydride slurry then can be removed for application. The hydroxide may be partly reused or recycled by reduction to metal for feeding back to the reactor. Although the system Mg—H2O has been used in the illustration, the method could be applied to other systems.

Figure 4:
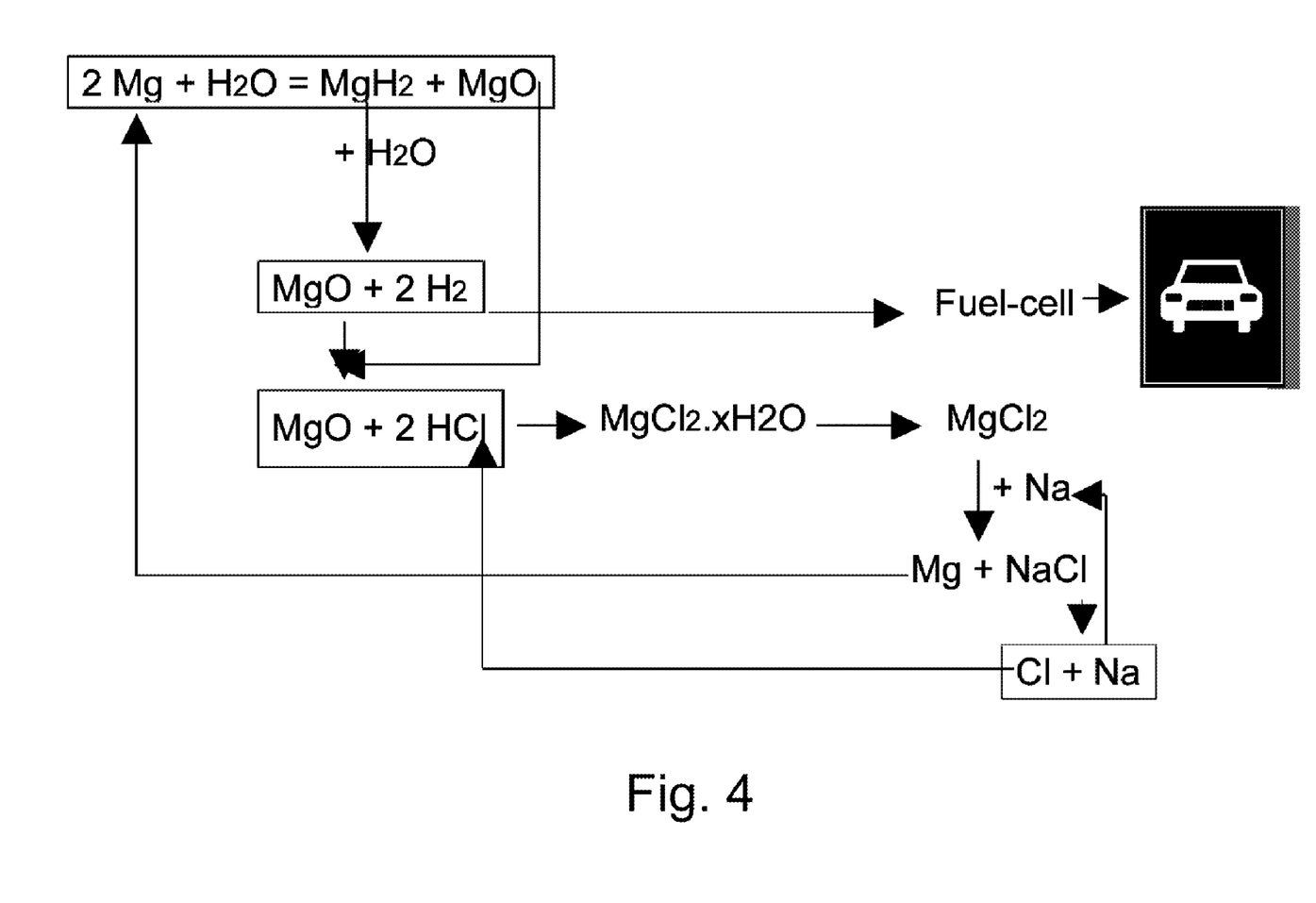
FIG. 4. is a flowchart.

FIG. 4. Conservation of materials. The figure shows that all matter is recycled and most of the cost of the operation is in energy requirements of the various processes.

Figure 5:
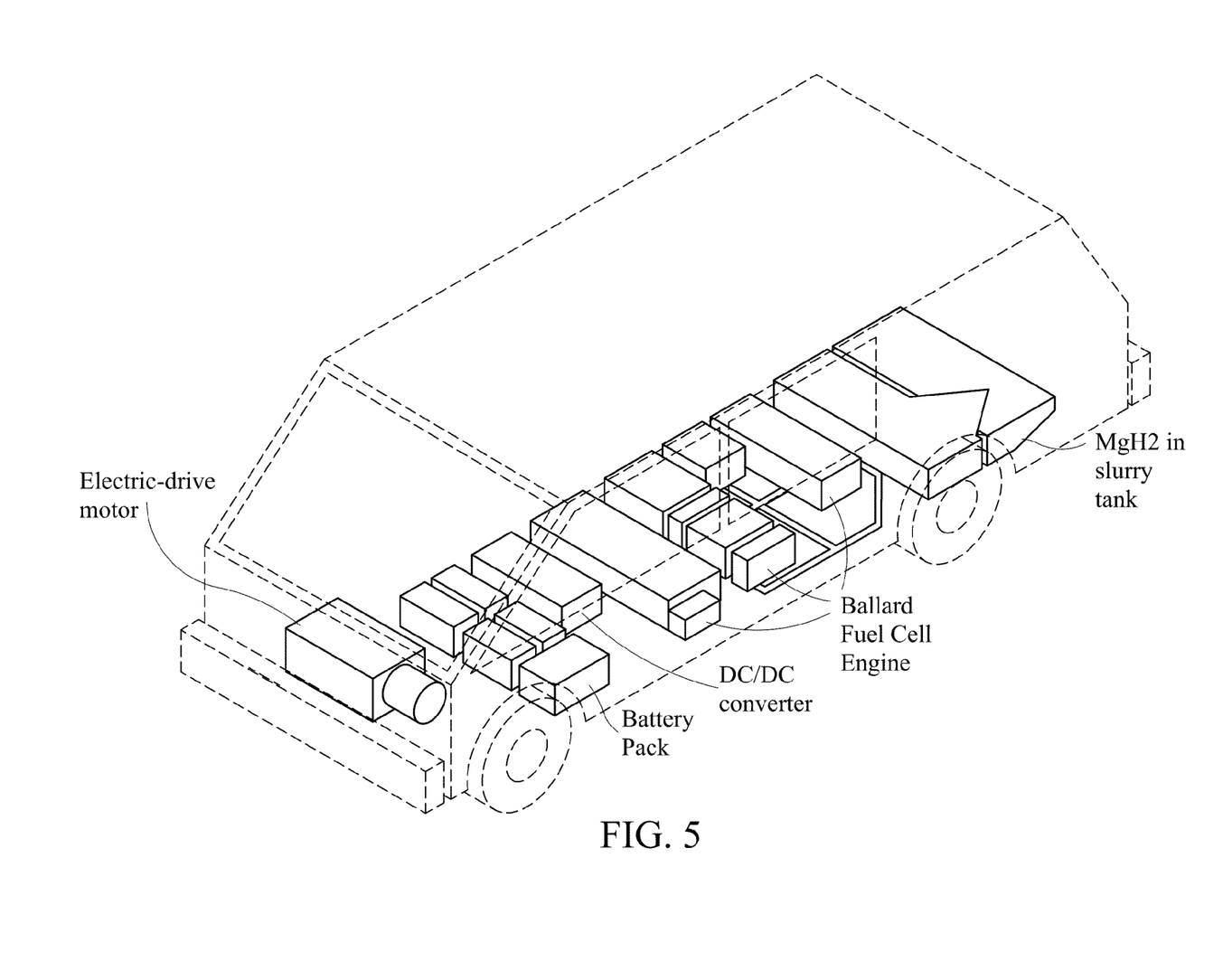
FIG. 5 is a drawing.

FIG. 5 shows an example of an fuel cell engine and the related components of an electric drive motor, battery pack, DC/DC converter, and slurry tank. It should be noted that it is contemplated as within the scope of the invention that the term "engine" can include any fuel-cell based or direct combustion engine. FIG. 5. Modified from Y. Wu from Millennium Cell Inc. Hydrogen on Demand™ Systems One Industrial Way West, Eatontown, N.J. 07724. The $MgH_2$ with a chemical slurry is shown as a replacement for the sodium borohydride system. A. W. McLane has also demonstrated the use of MgH2 and the slurry in fuel-cells for automobile use.

It can readily be seen from the foregoing that this invention provides a means for obtaining metal hydrides by reaction of water or hydroxide or HCl with metal without requiring hydrogen gas. The reaction with magnesium and hydroxide has been used as an example but the method is applicable to other hydrides such as NaAlH4 and NaBH4. The cheaper method may make it possible to lower the cost of using hydrides as storage for hydrogen. It is also to be noted that the recycling magnesium or MgH2 could be as cheap as sodium or sodium hydride material costs.

REFERENCES CITED

Andrew W. McClaine, Kenneth Brown, Sigmar Tullmann, Chemical Hydride Slurry for Hydrogen Production and Storage, DOE Hydrogen Program 2 FY 2006 Annual Progress Report.
A. W. McClaine, S. Tullman and K. Brown: Chemical hydrogen slurry for hydrogen production and storage. FY 2005 Progress Report: DOE hydrogen program.
A. W. McClaine, R. W. Breault, C. Larsen, R. Konduri, J. Rolfe, F. Becker and G. Miskolczy, Proceedings of the 2000 U.S. DOE Hydrogen Program Review NREL/CP-570-28890.
M. Klanchar, B. D. Wintrode, J. Phillips, Energy & Fuels, 11, 931-935 (1997).
L. P. Cook, E. R. Plante, NBSIR 85-3282: National Bureau of Standards: Gaithersburg, Md., (1985).
J. Besson, W. Muller, Compt. Rend., 247, 1869-1872, (1958).
S. H. Chan, C. C. Tan, Combust. Flame, 88, 123-136 (1992).

While the preferred embodiments of the invention have been shown and described, it is to be understood that they are merely illustrative and that changes may be made without departing from the scope of the invention as claimed. Accordingly, the scope of the inventive subject matter is determined by the scope of the following claims and their equitable Equivalents.

What is claimed is:

1. A process for the generation of hydrogen for use in an engine, comprising the steps of:
   a. producing a metal hydride slurry by reacting a powder metal with a first compound to form a metal hydride, wherein the powder metal is selected from the group consisting of magnesium, lithium, lithium-boron, and sodium-boron, and wherein the first compound is selected from the group consisting of water, hydroxide, aqueous $NH_4Cl$, and aqueous HCl, wherein the reaction is a low temperature process performed in a sealed inert gas flushed reaction chamber heated between 100 and 400° C.;
   b. reacting the metal hydride slurry with a second compound selected from water or water with aqueous HCl to provide hydrogen and metal oxide; and
   c. recycling metal from the metal oxide by reduction of the metal oxide with sodium or sodium hydride.

2. The process of claim 1 wherein the powder metal is magnesium and the first compound is water and the reaction in step (a) is described by the equation $2Mg+H_2O=MgH_2+MgO$.

3. The process of claim 1 wherein the powder metal is magnesium and the first compound is 2HCl and the reaction in step (a) is described by the equation $2Mg+2HCl=MgH_2+MgCl_2$, and further comprising the step of recycling Mg from MgO in step (c) as described by the equations:

$$MgO+2HCl=MgCl_2+H_2O;$$

$$MgCl_2+2Na=Mg+2NaCl.$$

4. The process of claim 1 wherein the powder metal is magnesium and the first compound is aqueous $NH_4Cl$ and the reduction in step (a) is described by the equation $4Mg+NH_4Cl=2\ MgH_2+0.5\ Mg_3N_2+0.5MgCl_2$, and further comprising the step of recycling Mg from $Mg_3N_2$ in step (c) as described by the equations:

$$Mg_3N_2+6HCl=2NH_3+3MgCl;$$

$$MgCl_2+2Na=Mg+2NaCl.$$

5. The process of claim 1, wherein the hydride formation reaction of step (a) is described by the equation $Li+B+H_2O=0.5\ LiBH_4+0.5\ LiBO_2$.

6. The process of claim 1, wherein the hydride slurry of step (a) is a mixture of hydride and oxide when the first compound is hydroxide, and further comprising the step of separating to individual phases the hydride from the oxide using a density separator.

7. The process of claim 1, wherein the hydroxide of step (a) is brucite ($Mg(OH)_2$).

8. The process of claim 1, wherein the process is performed on a vehicle.

9. The process of claim 1, wherein the hydride formation reaction of step (a) is described by the equation $Na+B+H_2O=0.5NaBO_2+0.5\ NaBH_4$.

10. The process of claim 1, wherein the hydride slurry of step (a) is a mixture of hydride and chloride when the first compound is aqueous $NH_4Cl$ or aqueous HCl, and further comprising the step of ($a_2$) separating to individual phases the hydride from the chloride using a density separator.

* * * * *